Figure 1:
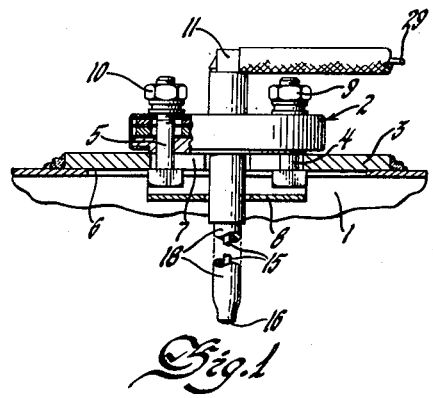

Dec. 28, 1954   G. H. FAGG ET AL   2,698,352
THERMOCOUPLE
Filed Feb. 1, 1952

INVENTORS
Gerald H. Fagg &
James L. Arthur
BY
Willits, Helwig & Baillie
ATTORNEYS

United States Patent Office 2,698,352
Patented Dec. 28, 1954

2,698,352

THERMOCOUPLE

Gerald H. Fagg and James L. Arthur, Indianapolis, Ind., assignors to General Motors Corporation, Detroit, Mich., a corporation of Delaware Application February 1, 1952, Serial No. 269,512

11 Claims. (Cl. 136—4)

This invention relates to thermocouples and more particularly to a thermocouple adapted for installation on the exhaust duct of an aircraft jet engine, or in similar locations.

An aircraft jet engine is provided with an exhaust duct which carries away gaseous combustion products of extremely high temperature. It is necessary to measure the temperature of these combustion products at various points. Thermocouples which protrude into the exhaust duct have been generally used for these temperature measurements even though much difficulty has been experienced in attempting to provide a satisfactory thermocouple that will meet the peculiar requirements of installation inherent with a jet engine. Some of the more important requirements and the reasons underlying them are:

That portion of the thermocouple which lies outside of the exhaust duct must be of little height, as present day jet engine installations provide a clearance of only slightly more than 1 inch above the outer skin of the exhaust duct for the thermocouple and its harness.

The thermocouple harness must connect to the thermocouple at a point slightly above the outer skin of the exhaust duct so that the harness will be insulated from the heat of the exhaust duct by an intermediate layer of cooling air. In addition, it is desirable that the thermocouple harness be readily disconnectible from the thermocouple so that economical repairs may be accomplished in the event of harness or thermocouple failure.

The thermocouple and its mounting means should be as small as possible so as to reduce its weight, for a number of thermocouples are utilized and a reduction in the weight of every element is a vital factor of aircraft design. In addition, it is desirable that the thermocouple and its mounting be practically gas leakage proof so as to prevent excessive heating of the harness.

The thermocouple must be of rugged temperature resistant construction, for the exhaust gases attain temperatures well over 1200 degrees Farenheit.

Some of the objects of this invention, therefore, are to provide a thermocouple that is resistant to high temperatures, that is of minimum size and weight, that is practically gas leakage proof, and that may be easily disconnected from its harness.

Other objects of this invention are to provide a thermocouple that is economical to manufacture and that is of simple and rugged construction.

Further objects and advantages of the present invention will be apparent from the following description, reference being had to the accompanying drawings, wherein a preferred form of the invention is clearly shown.

Figure 2:
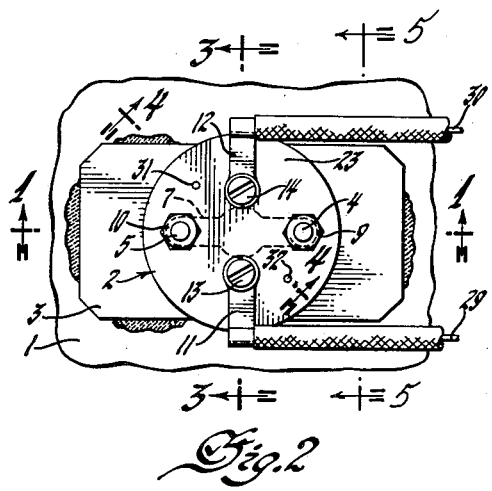
Figure 3:
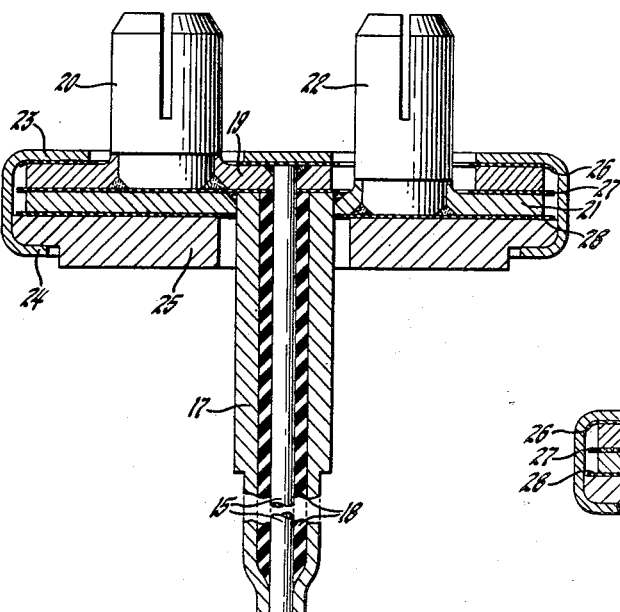
Figure 4:
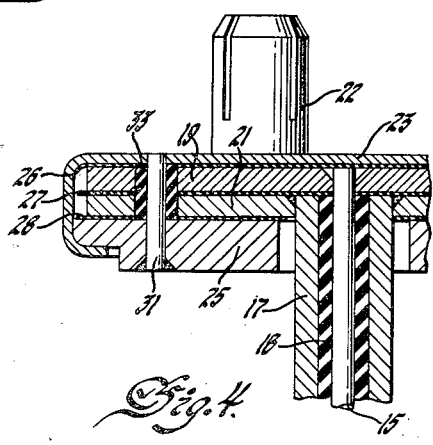
Figure 5:
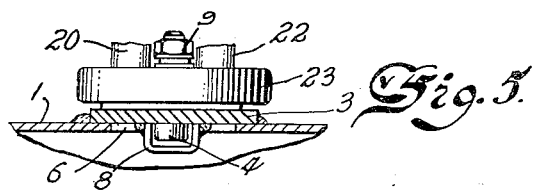

In the drawings: Fig. 1 is an elevation view of the thermocouple with parts cut away, illustrating its installation in a partial section of the exhaust duct of a jet engine taken along the line 1—1 of Fig. 2; Fig. 2 is an external plan view of the thermocouple mounted on a cutaway portion of the exhaust duct; Fig. 3 is a longitudinal partial section of the thermocouple taken along the line 3—3 of Fig. 2; Fig. 4 is a partial cross-sectional view of the thermocouple taken along the line 4—4 of Fig. 2; and Fig. 5 is a partial cross sectional view of the thermocouple taken substantially along the line 5—5 of Fig. 2.

Referring now to the drawings and more particularly to Figs. 1 and 2, a portion of the exhaust duct wall is indicated by the numeral 1. A thermocouple assembly, generally indicated by the numeral 2, is secured to the flat plate 3 by bolts 4 and 5. The plate 3 is welded as indicated to the wall 1 and overlies an opening 6 in the wall.

An elongated slot 7 is provided in the plate 3. The slot 7 is centrally enlarged to permit insertion of the heads of the bolts 4 and 5 through the plate 3; the remainder of the slot 7 being of less width than the heads of the bolts 4 and 5, to thereby prevent their removal. A U-shaped channel 8 having its legs straddling the slot 7 is welded to the underside of the plate 3.

Mounting of the thermocouple assembly 2 onto the wall 1 is accomplished by successively inserting the headed ends of the bolts 4 and 5 through the enlarged portion of the slot 7 and sliding them to the outer extremities of the slot 7; the channel 8 serving to prevent rotation of the bolts by engaging the bolt heads between its walls and also serving to prevent the possibility of the bolts falling through the slot and into the exhaust duct. The thermocouple assembly 2 is then mounted on the bolts 4 and 5 and is tightened against the plate 3 by the nuts 9 and 10. The harness lead terminals 11 and 12 may then be joined to terminal posts on the thermocouple assembly by means of the screws 13 and 14.

Referring now to Fig. 3 for a more detailed description of the thermocouple assembly 2 of Fig. 1, an alumel rod 15 is shown welded at 16 to the swaged or otherwise reduced tip of an encircling chromel tube 17 and separated therefrom over the remainder of its length by a layer of electrically insulating soapstone powder 18. The alumel rod 15 is welded at its upper end to a thin circular plate or disk 19 which is also of alumel composition. An alumel terminal post 20 is welded as shown to the disk 19. A thin circular plate or disk 21 of chromel composition similarly joins the chromel terminal post 22 and the chromel tube 17. A cup 23 having its rim 24 spun over a base plate 25 is utilized as a casing to retain the disks 19 and 21 in assembled relation. The casing and base plate may be of any suitable heat resistant material such as stainless steel, and are provided with openings sufficiently large to clear the terminal posts and the tube 17.

Sheets 26, 27, and 28 of mica or any suitable insulating material are provided to insulate the disks 19 and 21 from each other and from the casing. These sheets are provided with openings for the bolts 4 and 5 of smaller diameter than the openings in the disks 19 and 21. Alumel wire 29 is secured to the terminal post 20 by the connector 11 (Fig. 2) and screw 13 and chromel wire 30 is secured to the terminal post 22 by the connector 12 and screw 14. This connector assembly is the subject matter of application Serial Number 193,981, filed November 3, 1950, and need not be explained herein, as the details thereof are immaterial to the present invention.

The wires 29 and 30 are connected to a suitable indicating device (not shown) such as a galvanometer, a millivoltmeter, or a potentiometer to measure the E. M. F. which is generated by the "hot end" 16 of the thermocouple and thereby to indicate the temperature of the exhaust gases in the exhaust duct in the well-known manner. It may be noted here that alumel is much more subject to crystallization and breakage than chromel and for this reason it is advisable to have the chromel tube encase the alumel rod as shown, and it is further noted that this chromel-alumel combination will withstand temperatures up to a maximum of 2200 degrees Fahrenheit. However, the invention may be employed with other couple materials where suitable.

The disks 19 and 21 are initially located on the base plate 25 by a pair of pins 31 and 32 as illustrated in Figs. 2 and 4. The pin 31 is suitably insulated from the disks by a quartz bushing 33 and a similar bushing is provided for the pin 32.

It should now be apparent that we have devised a thermocouple assembly that is readily mountable on an exhaust duct wall, that is rugged, that is able to withstand high temperatures, and that is economical in construction. It should also be apparent that we have devised a thermocouple assembly which has both fastening means and harness disconnecting means in a minimum of space, and that is of minimum size and weight.

While the form of embodiment of the invention as herein disclosed constitutes a preferred form, it is to be understood that other forms might be adopted, as may come within the scope of the invention.

We claim:

1. A thermocouple comprising a first metallic member including a plate having thereon a downwardly projecting rod and an upwardly projecting terminal post; a second metallically dissimilar member including a plate underlying the plate of said first member and having thereon a downwardly projecting tube surrounding said rod and an upwardly projecting terminal post spaced from the terminal post of said first member, said members being everywhere insulated from each other excepting for a junction of said rod and tube at their common end; and means for retaining said plates in superimposed relation.

2. A thermocouple comprising a first metallic member including a plate having a downwardly projecting rod and an upwardly projecting terminal post laterally spaced from said rod; a second metallically dissimilar member including a plate underlying the plate of said first member and having a downwardly projecting tube surrounding said rod and an upwardly projecting terminal post laterally spaced from said tube and the terminal post of said first member; a metallic casing for retaining said plates in superimposed relation including a base plate and a cup having its rim crimped over said base plate; and means for mounting said casing on a supporting wall, said members being everywhere insulated from said wall and casing and from each other excepting for a junction of said rod and tube at their common end.

3. A thermocouple comprising a first member including a plate having a downwardly projecting rod and an upwardly projecting terminal post laterally spaced from said rod; a second member including a plate underlying the plate of said first member and having a downwardly projecting tube surrounding said rod and an upwardly projecting terminal post laterally spaced from said tube and the terminal post of said first member, said members being of dissimilar metallic composition, said rod and tube being joined at their common end and elsewhere insulated from each other; insulating sheets above, below, and between said plates; and a casing for retaining said plates and sheets in superimposed relation.

4. A thermocouple comprising a first member including a plate having a downwardly projecting rod and an upwardly projecting terminal post laterally spaced from said rod; a second member including a plate underlying the plate of said first member and having a downwardly projecting tube surrounding said rod and an upwardly projecting terminal post laterally spaced from said tube and the terminal post of said first member, said members being of dissimilar metallic composition, said rod and tube being joined at their common end and elsewhere insulated from each other; insulating sheets above, below, and between said plates; a metallic casing for retaining said plates and sheets in sandwiched relation including a base plate and a cup having its rim crimped over said base plate; and means for mounting said casing on a supporting wall.

5. A thermocouple comprising a first metallic member including a thin disk having welded thereto a downwardly projecting coaxial rod and an upwardly projecting terminal post; a second metallically dissimilar member including a thin disk coaxial with and underlying the disk of said first member and having welded thereto a downwardly projecting coaxial tube surrounding said rod and an upwardly projecting terminal post spaced from the terminal post of said first member; and means for mounting said disks in superimposed relation on a supporting wall, said members being everywhere insulated from said wall and from each other excepting for a junction of said rod and tube at their common end.

6. A thermocouple comprising a first member including a thin disk having welded thereto a downwardly projecting coaxial rod and an upwardly projecting terminal post radially spaced from said rod; a second member including a thin disk coaxial with and underlying the disk of said first member and having welded thereto a downwardly projecting coaxial tube surrounding said rod and an upwardly projecting terminal post radially spaced from said tube and laterally spaced from the terminal post of said first member, said members being of dissimilar metallic composition, said rod and tube being welded at their common end and elsewhere insulated from each other; insulating sheets above, below, and between said disks; a metallic casing for retaining said disks and sheets in superimposed relation including a base plate and a cup having its rim spun over said base plate; and means for mounting said casing on a supporting wall.

7. A thermocouple comprising, in combination, a first member comprising a plate and a tube extending from one face of the plate; a second member comprising a plate superimposed on the first plate and an elongated post extending from the second plate through the tube; the two members being adapted to generate a thermoelectric potential; the ends of the tube and post remote from the plates being in contact, and the members being otherwise insulated from each other; means for securing an electrical conductor to each member; and means for retaining the said plates in superimposed relation.

8. A thermocouple comprising, in combination, a first member comprising a plate, a terminal thereon, and a tube extending from one face of the plate; a second member comprising a plate superimposed on the first plate, a terminal on the second plate, and an elongated post extending from the second plate through the tube; the two members being adapted to generate a thermoelectric potential; the ends of the tube and post remote from the plates being in contact, and the members being otherwise insulated from each other; and means for retaining the said plates in superimposed relation.

9. A thermocouple comprising, in combination, a first member comprising a plate and a tube extending from one face of the plate; a second member comprising a plate superimposed on the first plate and an elongated post extending from the second plate through the tube; the two members being adapted to generate a thermoelectric potential; the ends of the tube and post remote from the plates being in contact, and the members being otherwise insulated from each other; means for securing an electrical conductor to each member; and means for retaining the said plates in superimposed relation comprising a base and a cover on opposite sides of the plates of the members and means for fixing the base and cover together.

10. A thermocouple comprising, in combination, a first member comprising a plate, a terminal thereon, and a tube extending from one face of the plate; a second member comprising a plate superimposed on the first plate, a terminal on the second plate, and an elongated post extending from the second plate through the tube; the two members being adapted to generate a thermoelectric potential; the ends of the tube and post remote from the plates being in contact, and the members being otherwise insulated from each other; and means for retaining the said plates in superimposed relation comprising a base and a cover on opposite sides of the plates of the members and means for fixing the base and cover together.

11. A thermocouple comprising, in combination, a first member comprising a plate, a terminal from one face thereof, and a tube extending from the other face of the plate; a second member comprising a plate superimposed on the first plate, a terminal extending from one face of the second plate, and an elongated post extending from the other face of the second plate through the tube; the two members being adapted to generate a thermoelectric potential; the ends of the tube and post remote from the plates being in contact, and the members being otherwise insulated from each other, and means for retaining the said plates in superimposed relation comprising a base and a cover on opposite sides of the plates of the members and means for fixing the base and cover together, the said plates, base, and cover being formed with aligned openings to receive means for attaching the thermocouple.

References Cited in the file of this patent

UNITED STATES PATENTS

| Number | Name | Date |
| --- | --- | --- |
| 2,103,548 | Obermaier | Dec. 28, 1937 |
| 2,385,530 | Paille | Sept. 25, 1945 |
| 2,597,665 | Micholls | May 20, 1952 |

FOREIGN PATENTS

| Number | Country | Date |
| --- | --- | --- |
| 191,712 | Great Britain | July 5, 1923 |